United States Patent [19]

Hauck et al.

[11] Patent Number: 6,026,454
[45] Date of Patent: *Feb. 15, 2000

[54] INTERFACE FOR MULTIPLEXING AND REFORMATTING INFORMATION TRANSFER BETWEEN DEVICE DRIVER PROGRAMS AND A NETWORK APPLICATION PROGRAM WHICH ONLY ACCEPTS INFORMATION IN A PREDETERMINED FORMAT

[75] Inventors: John M. Hauck, Bridgman; Paul H. McCann, Lincoln Township, Berrien County; J. Richard Terrell, II, Berrien Springs; Bradley J. Staff, Lincoln Township, Berrien County, all of Mich.; S. Christopher Gladwin, Buffalo Grove, Ill.; Alan J. Soucy, Long Grove, Ill.; Jeffrey Schindler, Lindenhurst, Ill.

[73] Assignee: Packard Bell NEC, Inc., Sacramento, Calif.

[ * ] Notice: This patent is subject to a terminal disclaimer.

[21] Appl. No.: 08/169,492

[22] Filed: Dec. 17, 1993

[51] Int. Cl.⁷ ............................................. G06F 13/00
[52] U.S. Cl. ................................ 710/65; 395/681
[58] Field of Search ........................ 395/200, 275, 395/500, 280, 700, 775, 885, 200.18, 681; 370/94.1; 710/65

[56] References Cited

U.S. PATENT DOCUMENTS

| | | | |
|---|---|---|---|
| 4,430,651 | 2/1984 | Bryant et al. | 340/825.82 |
| 4,780,821 | 10/1988 | Crossley | 364/200 |
| 4,827,411 | 5/1989 | Arrowood et al. | 364/300 |
| 4,858,114 | 8/1989 | Heath et al. | 395/775 |
| 5,005,122 | 4/1991 | Griffin et al. | 364/200 |
| 5,109,515 | 4/1992 | Laggis et al. | 395/725 |
| 5,127,003 | 6/1992 | Doll, Jr. et al. | 370/110.1 |
| 5,133,065 | 7/1992 | Cheffetz et al. | 395/575 |
| 5,159,182 | 10/1992 | Eisele | 235/492 |
| 5,179,666 | 1/1993 | Rimmer et al. | 395/275 |
| 5,191,650 | 3/1993 | Kramer et al. | 395/200 |
| 5,212,772 | 5/1993 | Masters | 395/200 |
| 5,261,095 | 11/1993 | Crawford et al. | 395/650 |
| 5,265,239 | 11/1993 | Ardolino | 395/500 |
| 5,267,311 | 11/1993 | Bakhoum | 350/4 |
| 5,269,018 | 12/1993 | Lee | 395/575 |
| 5,276,865 | 1/1994 | Thorpe | 395/575 |
| 5,291,585 | 3/1994 | Sato et al. | 395/500 |
| 5,317,693 | 5/1994 | Cuenod et al. | 395/275 |
| 5,375,207 | 12/1994 | Blakely et al. | 395/200 |
| 5,404,519 | 4/1995 | Denio | 395/650 |
| 5,440,744 | 8/1995 | Jacobson et al. | 395/650 |
| 5,459,867 | 10/1995 | Adams et al. | 395/700 |
| 5,513,328 | 4/1996 | Christofferson | 395/280 |
| 5,537,417 | 7/1996 | Sharma et al. | 370/94.1 |
| 5,548,731 | 8/1996 | Chang et al. | 395/280 |
| 5,589,063 | 5/1986 | Shah et al. | 364/200 |

*Primary Examiner*—Thomas C. Lee
*Assistant Examiner*—Le Hien Luu
*Attorney, Agent, or Firm*—Fitch, Even, Tabin & Flannery

[57] ABSTRACT

A dedicated network expansion unit includes a processor and a dedicated hard disk drive, and has two bays which each can receive one of a further hard disk drive, a floppy disk drive, a CD-ROM drive, and a tape drive. The unit has no manual input mechanism, and no display for text or graphics. The unit can be connected to one or more communications link through Ethernet connectors, a PCMCIA modem card, a PCMCIA token ring card, or a parallel connector. Following power-up or a reset, the unit automatically detects the types of devices present and the types of communications link connected to it, and automatically configures its software to operate properly with these devices and links, without user interaction. Special software routines are provided for the unit and a remote computer to permit a conventional backup program in the remote computer to effect a backup operation within the expansion unit using ASPI commands. A further program effects a software interface between at least two communications link and a conventional network driver program designed to communicate with a single network.

9 Claims, 10 Drawing Sheets

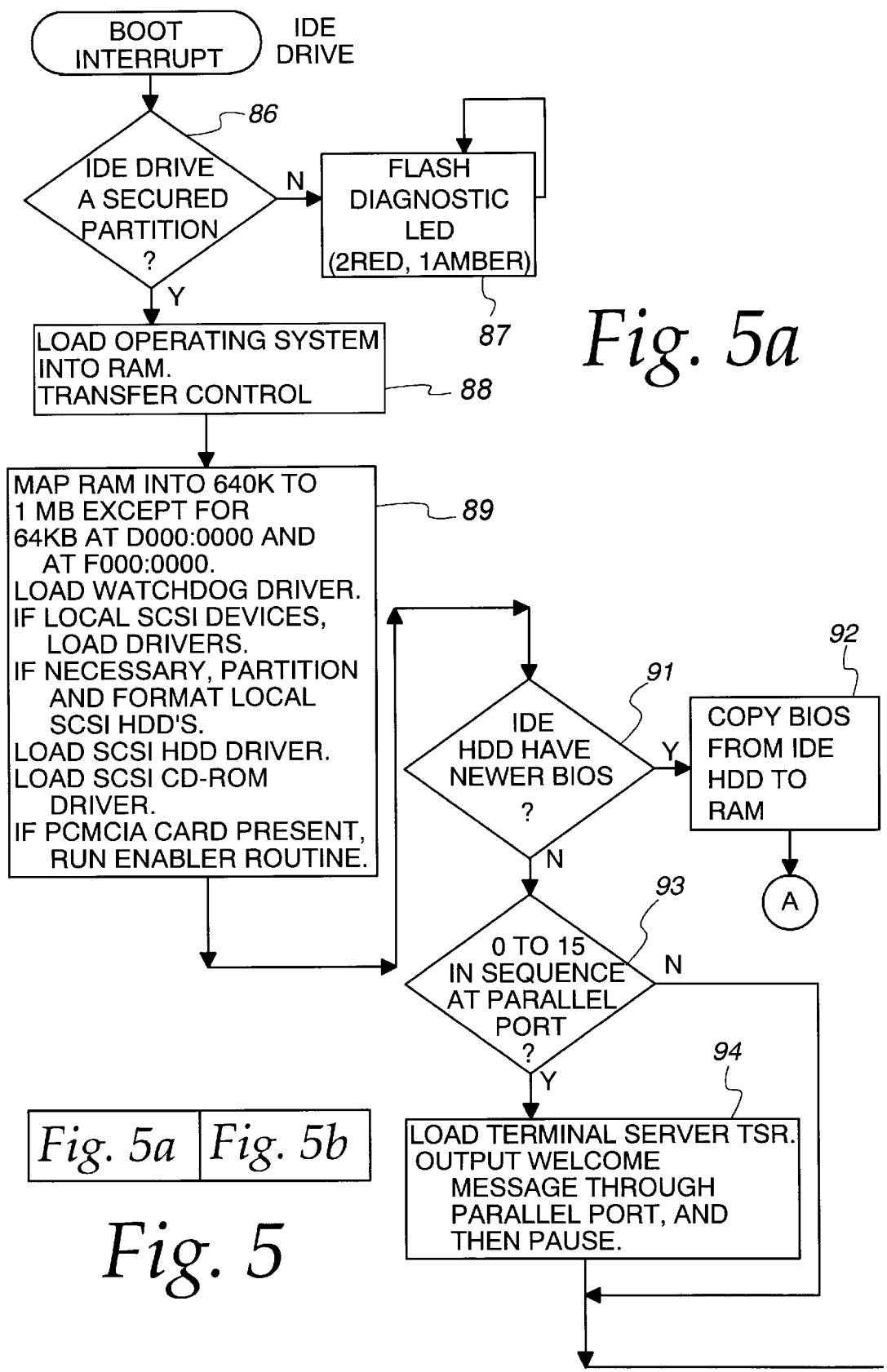

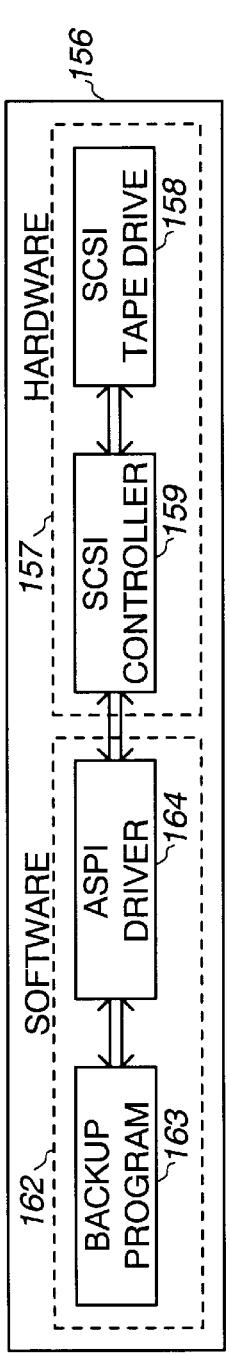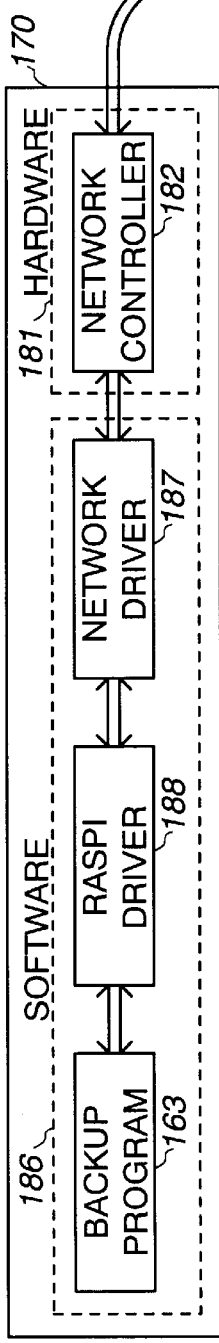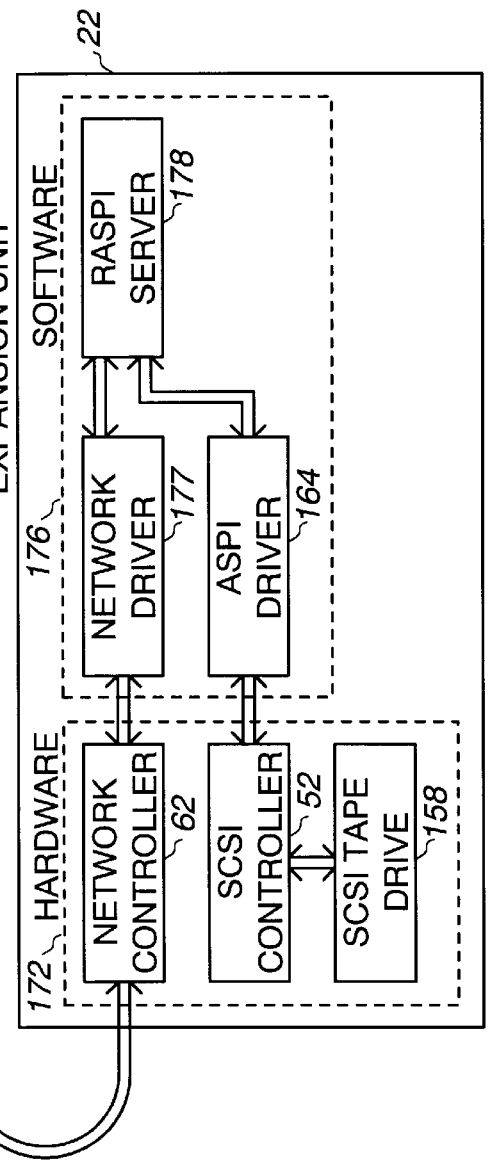
Fig. 11 PRIOR ART
Fig. 12

INTERFACE FOR MULTIPLEXING AND REFORMATTING INFORMATION TRANSFER BETWEEN DEVICE DRIVER PROGRAMS AND A NETWORK APPLICATION PROGRAM WHICH ONLY ACCEPTS INFORMATION IN A PREDETERMINED FORMAT

FIELD OF THE INVENTION

The present invention relates to a network server unit and, more particularly, to such a unit which is a dedicated server that lacks a graphic or textual user interface, that can effect backup operations under control of a conventional backup program running in a remote computer using ASPI conventions, and that can interface two or more communications links to a conventional network driver program designed to communicate with a single network.

BACKGROUND OF THE INVENTION

As personal computers have proliferated over the past fifteen years, resulting in a decentralization of computing power, communication links such as networks to interconnect personal computers have also proliferated in order to permit the personal computers to easily share information. Since many of the computers on a network need to use the same application program or access the same data files, it is inefficient to provide a large hard disk drive in each computer to store essentially redundant information. Instead, it has become common to provide at least one personal computer on the network which is known as a server and has one or more hard disk drives of very large capacity, the remaining personal computers having relatively small hard disk drives or having no hard disk drives.

When the server is turned on, it may be necessary for a user to use the video display and keyboard of the server to bring up and start the server software. Further, if a hard disk drive in the server is replaced or removed, or if a new hard disk drive is added, a substantial amount of interaction by a sophisticated operator is required to reconfigure the server and return it to a normal operational mode. Similarly, substantial interaction by a knowledgeable operator is necessary if the server is connected to a further communication link such as a network or is disconnected from one of several communication links. The keyboard and display of the server are also utilized by a user to back up the data on the disk drives of the server for archive purposes.

While servers of this type have been generally adequate for their intended purposes, they have not been entirely satisfactory in all respects. In particular, the need for the operator to be highly trained is inconvenient, and the time and effort required for an operator to bring the server up to an operational mode and to reconfigure the server after adding, removing or changing a component is inefficient. Moreover, the need for the server to have a keyboard and display in order to allow an operator to perform all these functions makes the server itself a relatively expensive unit.

Accordingly, one object of the present invention is to provide a dedicated server unit which is capable of automatically and efficiently detecting the devices present in it and the networks or communication links to which it is connected, and of automatically configuring its software to operate in a manner compatible with the devices and the networks or links detected. This would permit these tasks to be completed quickly and rapidly without the time or potential for error associated with a human operator, while avoiding the need to have someone available with the knowledge and skills to deal with the relatively complex tasks of configuring the system.

Since user interaction would be unnecessary, a further object would be to eliminate the keyboard and video display normally present on a server unit, thereby permitting a substantial reduction in the cost of the server unit.

A further object, since the dedicated server unit will have no user interface, is to provide a way of easily and efficiently backing up the data in the server unit from a remote computer on the network or communication link, and backing up data in the remote computer through the server unit.

A further object is to provide such a dedicated server unit which can be simultaneously connected to two or more communication links, and which can effect communication with each using a conventional driver program designed to operate with only a single network.

SUMMARY OF THE INVENTION

The objects and purposes of the invention, including those set forth above, are met according to one form of the present invention by providing a dedicated expansion unit which includes: a processor; a mass storage device; an interface arrangement for facilitating connection of the server unit to a communication link; and a program arrangement executed by the processor and responsive to commands received through the interface arrangement for storing in the mass storage device incoming information received through the interface arrangement and for supplying information stored in the mass storage device to the interface arrangement; the unit being free of a manually operable user input mechanism.

A different form of the present invention involves the provision of an apparatus which includes: first and second units which are physically separate; and a communication arrangement for effecting communication between the units through a communication link; wherein the first unit includes a first processor, an application program arrangement executed by the first processor for outputting an ASPI command, and a remote driver program arrangement executed by the first processor for intercepting the ASPI command and supplying the ASPI command to the communication arrangement for transmission through the communication link; and wherein the second unit includes a second processor, a peripheral device, an ASPI driver program arrangement executed by the second processor for controlling the peripheral device in response to ASPI commands, and a server program arrangement executed by the second processor for accepting the ASPI command transmitted through the communication link and supplying the ASPI command to the ASPI driver program arrangement.

Still another form of the present invention involves the provision of an apparatus which includes: a processor; a first communication link; a second communication link; a network application program arrangement executed by the processor for outputting outgoing information intended for a single predetermined network and for accepting incoming information expected from the predetermined network, the outgoing information including address information; and a further program arrangement executed by the processor for intercepting the outgoing information from the network application program arrangement and for supplying the outgoing information respectively to the first and second communication links when the address information therein respectively has a first value and a second value different from the first value, and for intercepting incoming information from each of the first and second communication links and for supplying the incoming information from the first and second communication links to the network application program arrangement with respective different address values therein which respectively correspond to the first and second communication links.

BRIEF DESCRIPTION OF THE DRAWINGS

A preferred embodiment of the invention is described in detail hereinafter with reference to the accompanying drawings, in which:

FIG. 11 is a diagrammatic view of a hardware and software configuration in a conventional personal computer;

FIG. 12 is a diagrammatic view of the expansion unit of FIG. 1 connected through a network to a conventional personal computer, and hardware and software configurations in each of them;

DETAILED DESCRIPTION

Figure 2:
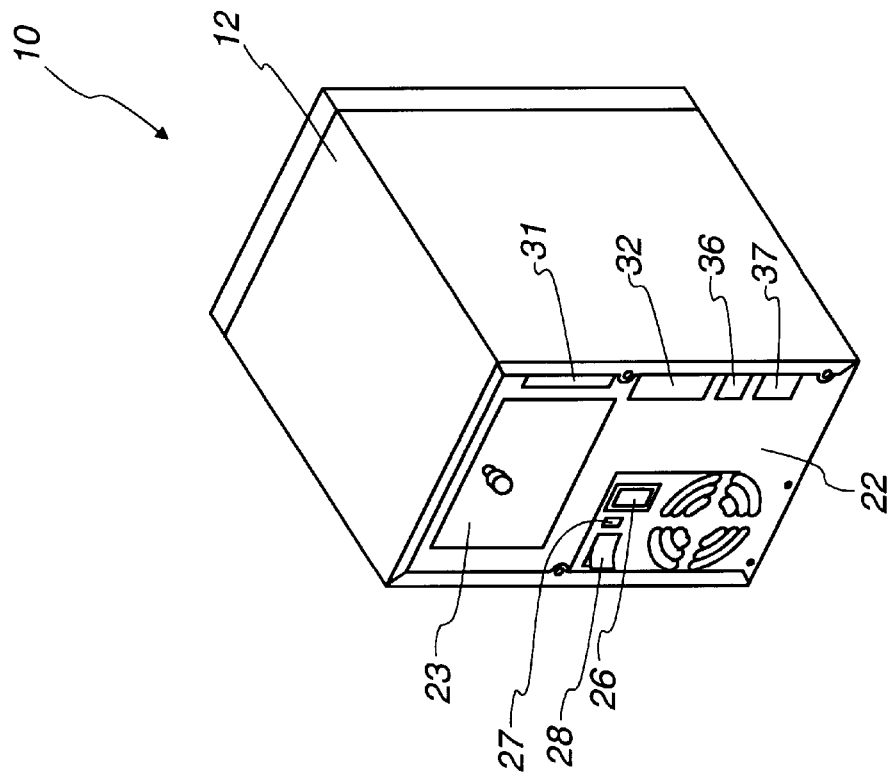
FIG. 2 is a perspective view of the dedicated network expansion unit of FIG. 1, and shows the back side thereof.
Figure 1:
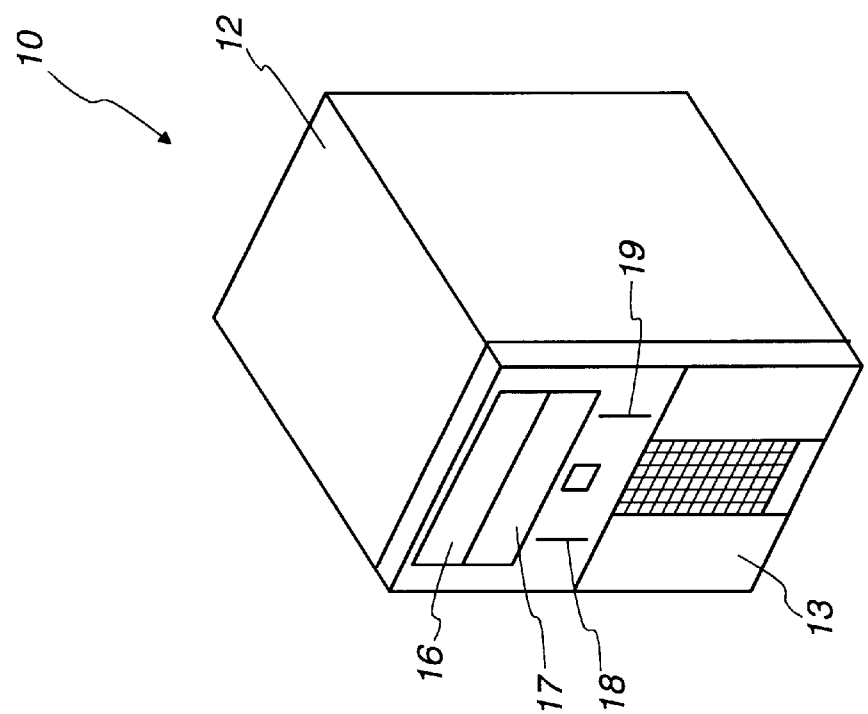
FIG. 1 is a perspective view of a dedicated network expansion unit which embodies the present invention, and shows the front side thereof.

Referring to FIGS. 1 and 2, reference numeral 10 designates a dedicated network expansion unit which embodies the present invention. The expansion unit 10 includes a rectangular housing 12, which in the preferred embodiment has dimensions of 7.8 inches wide by 11.5 inches high by 10.9 inches deep.

The housing 12 has in a front side 13 a top bay 16 and a bottom bay 17 which each have a removable cover. One of several conventional peripheral devices may optionally be installed in each of the bays 16 and 17. In particular, either of the bays can removably receive a conventional dual floppy disk drive compatible with both 5.25-inch and 3.5-inch floppy disks, a conventional small computer systems interface (SCSI) hard disk drive (HDD) with a capacity of 250 MB, 500 MB or 1000 MB, a conventional SCSI compact disk read only memory (CD-ROM), or a conventional SCSI tape drive with a capacity of 250 MB on one quarter inch tape or 2 GB on 4 mm DAT. Each of the bays can have a different one of these devices or both bays can contain identical devices. Alternatively, one or both bays can be left empty with the associated cover in place.

The front panel 13 of the housing 12 also has a power/diagnostic light emitting diode (LED) 18, which actually includes two LEDs of different color (green and red) which can be turned on separately or simultaneously to generate three colors (green, amber and red). As will be explained in more detail later, the LED 18 is off when the unit is off, is steady amber when the unit is initializing itself, is steady green when the unit has finished initialization and is ready for normal operation, cyclically emits two red flashes followed by one amber flash if an internal HDD is not bootable, and cyclically emits one red flash followed by one amber flash if a hardware error is detected. The front panel 13 also has a HDD status LED 19, which is simply a conventional HDD access light which is on when the internal HDD is being accessed and is off when the internal HDD is not being accessed.

Referring to FIG. 2, a rear side 22 of the housing has a door 23 through which the interior of the housing 12 can be accessed. The rear side also has an AC connector 26 to which a conventional AC power cord can be connected, and a voltage select switch 27 which can be used to identify the AC voltage being supplied to the unit 10 through the AC power cord (for example 110 VAC). The rear side of the unit also has an on/off switch 28 used to turn the unit 10 on and off.

The rear side of the unit also has a conventional PCMCIA connector or slot 31, which can removably receive one of a conventional PCMCIA modem card, a conventional PCMCIA token ring card, or a conventional PCMCIA memory card containing program files 9 (and hereinafter referred to as a PCMCIA boot card). Also on the rear side 22 of the housing 12 is a conventional parallel connector 32, namely a female DB-25 connector. Below the parallel connector 32 is a conventional 10-Base-T network connector 36, and below that is a conventional AUI network connector 37 commonly known as a FriendlyNet connector.

It should be noted that the expansion unit 10 has no cathode ray tube (CRT) or liquid crystal display (LCD) video display, and has no multi-segment LED displays, or in other words has no display with a capability to present graphic images or alphanumeric text. Similarly, and recognizing that the manual switches 27 and 28 cannot as a practical matter be changed while the unit is operating, the unit 10 has no manual input mechanism. In fact, it should be noted that the unit has no video connector or other display connector for an external display, and has no keyboard connector or equivalent connector for an external keyboard, keypad or similar manual input device.

Figure 3:
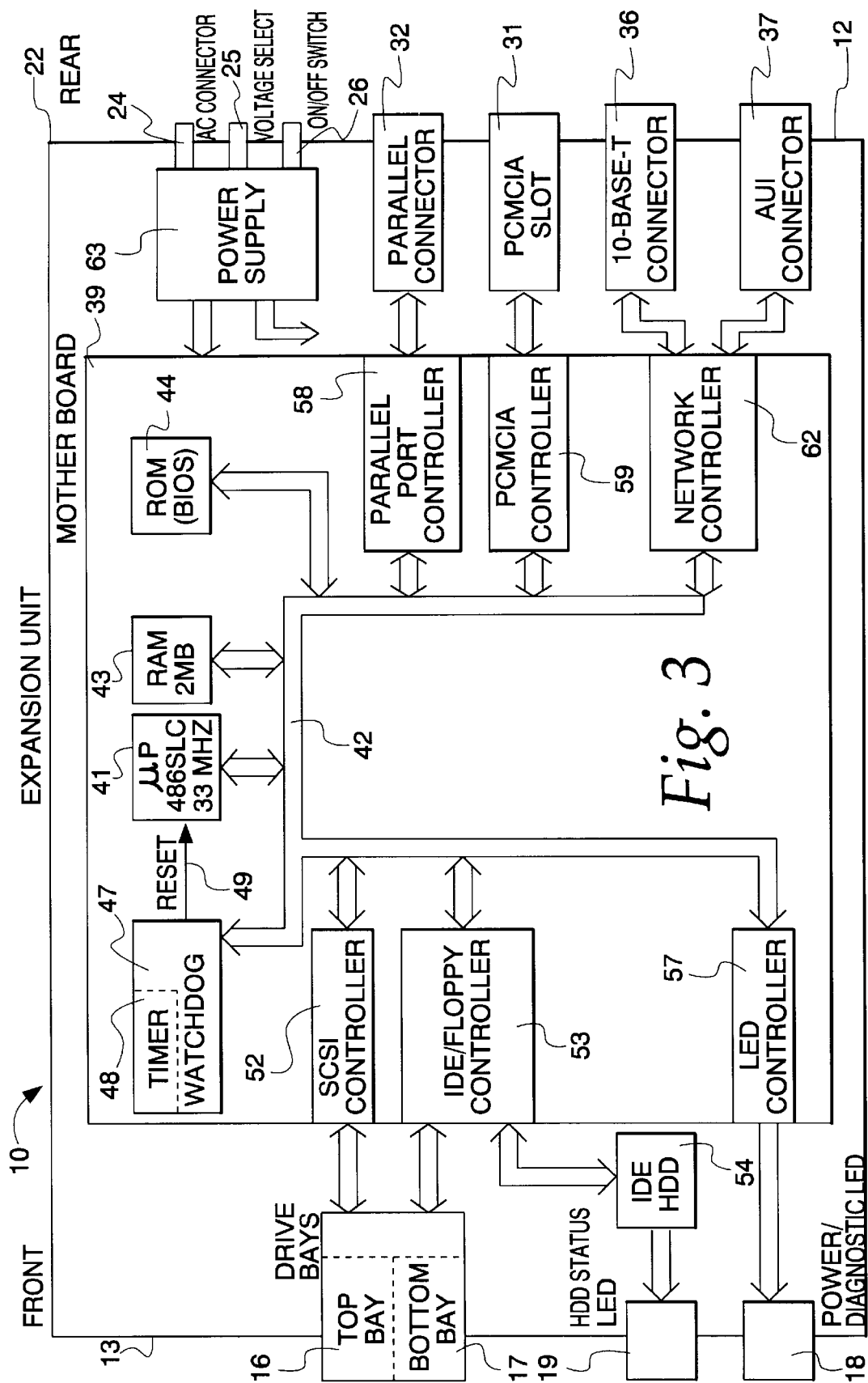
FIG. 3 is a block diagram of the major components of the network expansion unit of FIG. 1 and interconnections between the components.

FIG. 3 is a block diagram of the major components within the expansion unit 10. The housing is shown diagrammatically at 12, with the front side 13 to the left and the rear side 22 to the right. At the front side are the above-described drive bays 16 and 17 and the LEDs 18 and 19. On the rear side are the above-described AC connector 24, switches 25 and 26, parallel connector 32, PCMCIA slot 31, and network connectors 36 and 37.

Mounted on a not-illustrated chassis within the housing 12 is a main circuit board 39 referred to as the motherboard. On the motherboard 39 is a microprocessor 41, which in the preferred embodiment is a conventional 33 MHz 486SLC commercially available from Cyrix Corporation of Richardson, Tex. The microprocessor 41 communicates with other components on the motherboard 39 through a conventional bidirectional bus shown diagrammatically at 42. A 2

MB random access memory (RAM) 43 is coupled to the bus 42, as is a read only memory (ROM) 44. The ROM 44 contains the basic input/output system (BIOS) for the microprocessor 41. In the preferred embodiment, a socket is soldered in the motherboard 39 and the ROM 44 is removably inserted in the socket, but the ROM 44 could instead be directly soldered in the motherboard. In the preferred embodiment, the RAM 43 is dynamic random memory (DRAM), but it will be recognized that other types of RAM could also be used.

A watchdog circuit 47 is also coupled to the bus, and includes a hardware timer 48 which preferably has a duration of about 32 seconds. The watchdog circuit 47 outputs a reset signal 49 which is coupled to and can reset the processor 41. As discussed in more detail later, a program executed by the processor 41 must periodically restart the timer 48. If at any point the program fails to restart the timer 48 before it expires, the watchdog circuit 47 will generate the reset signal 49 to reset the processor 41. Also, if a program being executed by the processor 41 determines that an immediate reset is required, it can cause immediate generation of a software-generated processor reset. Also on the motherboard 39 is a SCSI controller circuit 52 which is coupled to the bus 42 and to the bays 16 and 17, and which in the preferred embodiment conforms to the SCSI-2 standard. If one or both bays have a SCSI peripheral device therein, each such SCSI device is controlled by the controller circuit 52.

The motherboard 39 also has an IDE/floppy disk controller circuit 53, which is connected to the bus 42 and to the bays 16 and 17. If the above-mentioned dual floppy disk drive is installed in either of the bays 16 or 17, it is controlled by the controller circuit 53. The controller circuit 53 is also coupled to an internal IDE HDD 54, which is mounted on the not-illustrated chassis and outputs control signals for the HDD status LED 19. The HDD 54 is a conventional and commercially available 3.5-inch HDD preferably having a capacity of 120 MB, 250 MB or 500 MB.

For clarity in the explanation which follows, it should be noted that the expansion unit 10 may have up to three hard disk drives, namely the permanently-installed IDE HDD 54, and one or two SCSI HDD devices installed in one or both of the bays 16 and 17. Since the expansion unit 10 is designed for use as a network server, and is thus likely to need a substantial amount of hard disk space, it would be very common for the unit to have one or two SCSI HDD devices in addition to the IDE HDD 54.

The motherboard 39 also has an LED controller circuit 57 which drives the power/diagnostic LED 18, the controller circuit 57 being effectively an output port of the processor 41. A conventional parallel port controller circuit 58 is provided on the motherboard 39 and is coupled to both the bus 42 and the parallel connector 32. The parallel port controller circuit 58 implements a conventional Centronics bidirectional parallel interface. Also on the motherboard 39 is a conventional PCMCIA controller circuit 59, which is coupled to the bus 42 and to the PCMCIA slot 31. In the preferred embodiment, the controller circuit conforms to PCMCIA Release 2.0 Type II. The PCMCIA slot 31 can receive a PCMCIA token ring card which operates at a speed of either 4 MB or 16 MB.

A conventional network controller circuit 62 is also provided on the motherboard 39, is coupled to the bus 42, and is coupled through separate cables to each of the network connectors 36 and 37. In the preferred embodiment, the controller circuit 62 implements a network format commonly known as EtherNet, which meets the IEEE 802 specification.

The not-illustrated chassis of the unit 10 also supports a power supply 63, which receives AC power through the connector 24, which is responsive to switches 25 and 26, and which supplies the necessary voltages to the motherboard 39 and to other electrical components within the housing 12.

Figure 4:
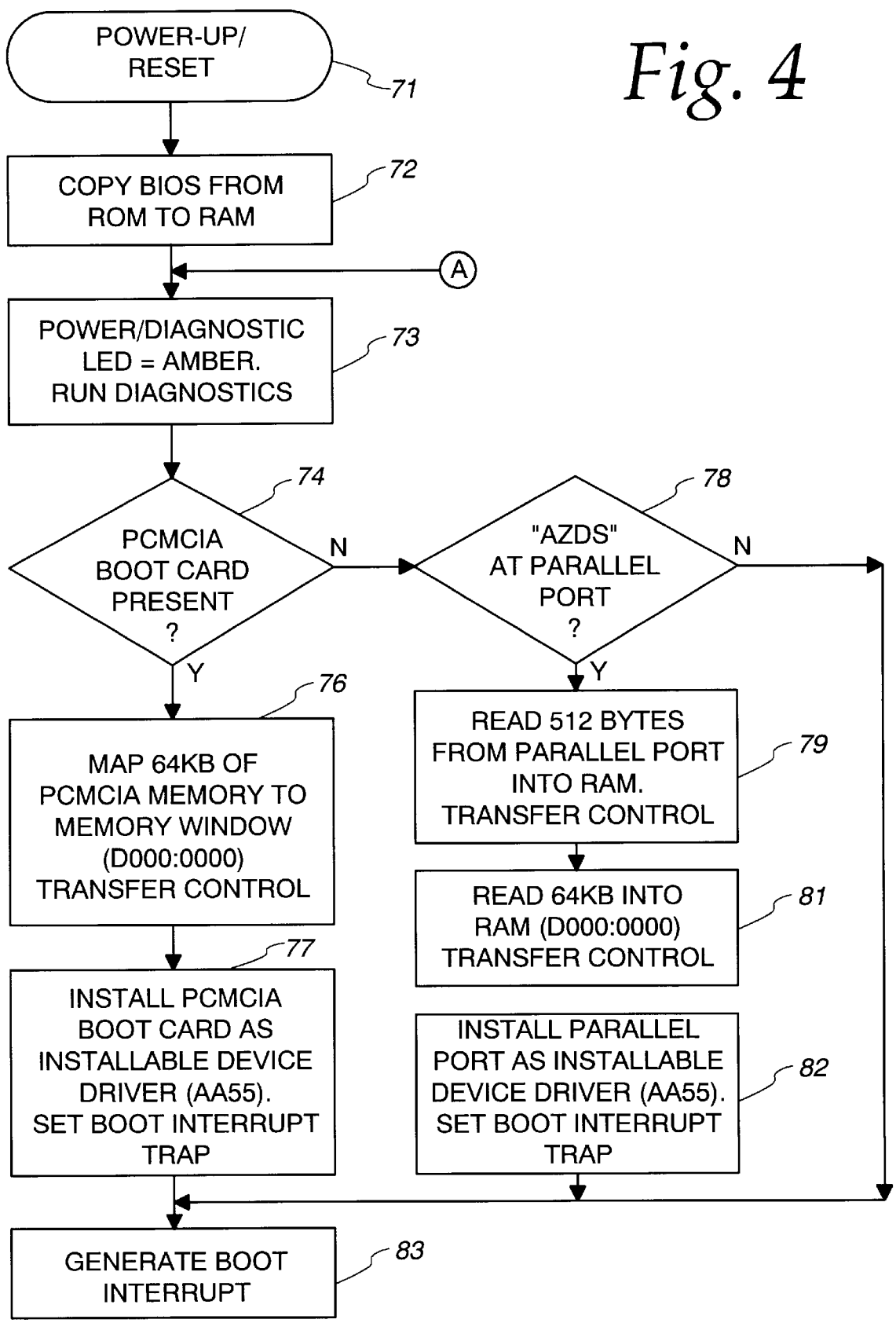
FIG. 4 is a flowchart of a power-up/reset routine executed by the expansion unit of FIG. 1.
Figure 5B:
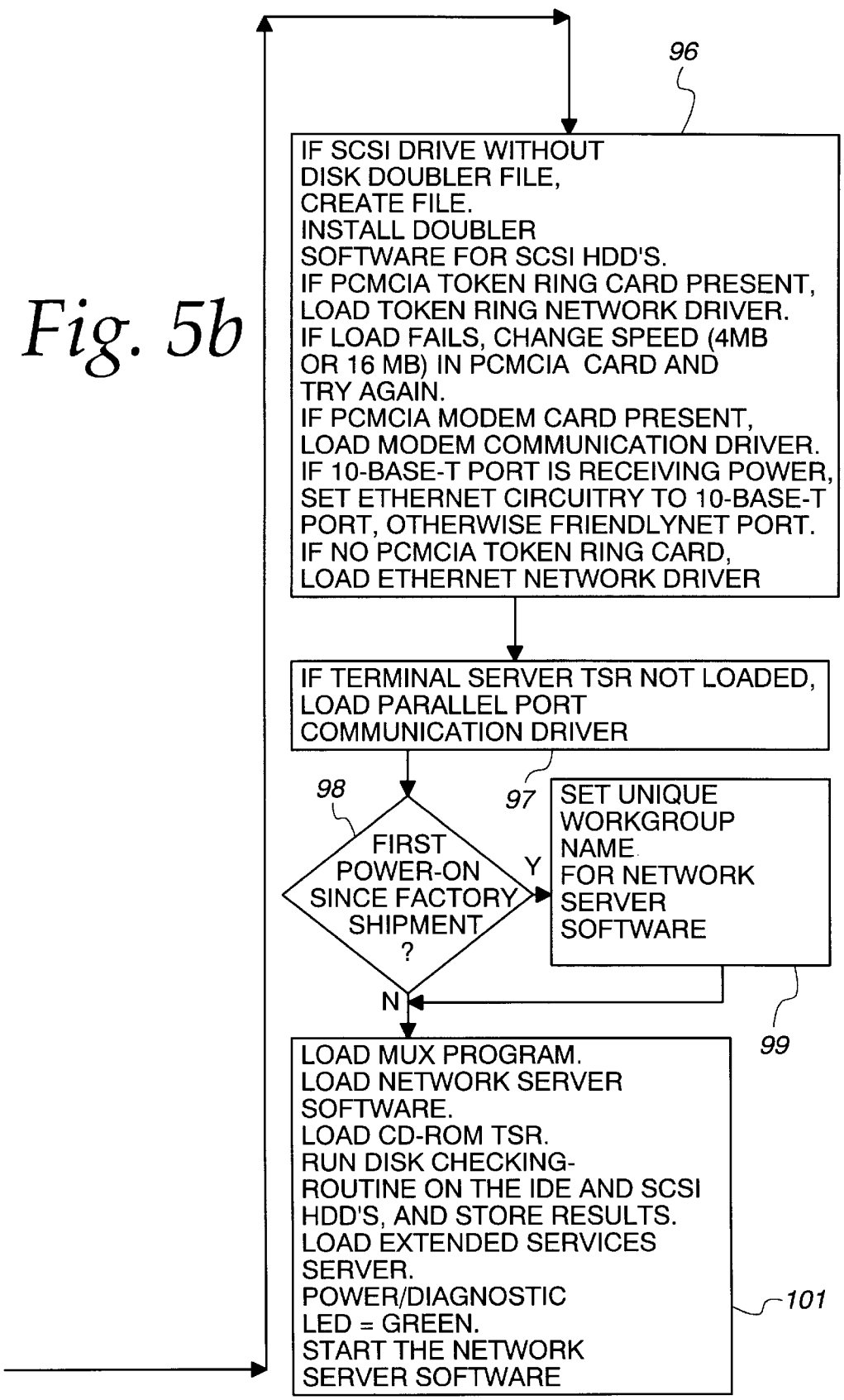
FIG. 5 is a flowchart of a routine executed by the expansion unit of FIG. 1 for booting from an internal hard disk drive.

FIGS. 4 and 5 are flowcharts showing the standard sequence which occurs when the processor 41 is released from a reset, where the reset is generated either by the power being turned on or by the signal 49 from the watchdog circuit 47. Some preliminary comments will facilitate a better understanding of the explanation of FIGS. 4 and 5.

First, it should be understood that the unit 10 will normally "boot" or self-initialize using the IDE HDD 54, but can alternatively boot from a PCMCIA boot card if one is present in the slot 31, or from a conventional and not-illustrated personal computer coupled through a conventional bidirectional parallel cable to the parallel connector 32. Second, the unit 10 can be connected to an Ethernet network-type communication link through either one of the connectors 36 and 37 (but not both at the same time), to a token ring network-type communication link if a PCMCIA token ring card is present in slot 31, to a modem-based communication link if a PCMCIA modem card is present in slot 31, or to a parallel port communication link through the connector 32. In fact, the expansion unit can be simultaneously connected to more than one of these communication links at the same time, provided that only one of the Ethernet connectors 36 and 37 is active at any given time, and provided that neither of the EtherNet connectors 36 and 37 is active if a PCMCIA token ring network card is present in the slot 31.

Turning now in more detail to FIGS. 4 and 5, at the end of a reset the processor 41 begins program execution at a predetermined location in the BIOS in ROM 44, which corresponds to the transition from block 71 to block 72 in FIG. 4. At block 72, the processor 41 copies the BIOS routines from ROM 44 to RAM 43. Although it would be possible to execute the BIOS routines from ROM, they execute faster from RAM, and it thus improves system performance to have them in RAM 43. Control then proceeds to block 73, where the processor 41 uses the circuit 57 to set the power/diagnostic LED 18 to an amber color, to indicate that the unit 10 is being initialized. The processor then runs diagnostic routines from the BIOS, in an attempt to detect hardware faults.

After satisfactory completion of the diagnostics, control proceeds to block 74, where the processor checks to see if a PCMCIA boot card is present in the PCMCIA slot 31. If it is, then at block 76 the processor sets up the PCMCIA control circuit 59 to map 64 KB of memory in the PCMCIA boot card to a memory window starting at address D000:0000, and then transfers control to a routine present in this portion of the PCMCIA memory. This routine in the PCMCIA boot card corresponds to block 77, and installs the boot card as an installable device driver, including setup of the boot interrupt traps so that control is transferred to the PCMCIA boot card in response to the boot interrupt.

If it was determined at block 74 that no PCMCIA boot card is present in the slot 31, then at block 78 the processor attempts to read four bytes of data through the parallel port (using conventional handshaking), and if it receives four bytes and they are the respective ASCII codes for the letters "AZDS", then the processor knows that a conventional personal computer is connected to the parallel port and is running a simple program which outputs the "AZDS" code and can output two predetermined data blocks. In particular, at block 79 in FIG. 4 the processor reads a first block of 512 bytes from the parallel port into the RAM 43, and then transfers control to a short program in this 512 byte block. This program in turn, as represented by block 81, reads a second block of 64 KB into a portion of the RAM 43 starting at address DOOO:OOOO, and then transfers control to a program in this second block. The latter program is represented by block 82, and installs the parallel port as an installable device driver, including setup of the boot interrupt trap so that the occurrence of the boot interrupt causes processor control to be transferred to the routine in the 64 KB second block.

If the processor receives no response from the parallel port in block 78, or if it received a response which was not the letters "AZDS", then control proceeds to block 83. Control also proceeds to block 83 from either of blocks 77 and 82. In block 83, the processor generates the boot interrupt. If a PCMCIA card was detected in slot 31 or if the code "AZDS" was received through the parallel port at block 78, the processor will begin executing a program routine in the memory of the PCMCIA card or in the 64 KB block transferred into RAM 43 from parallel port 32. During normal operation, these conditions will not be met and the boot interrupt will cause processor control to be transferred to a booting routine in the BIOS, which will attempt to boot the system from the internal IDE HDD 54 in a manner which will now be described in more detail with reference to FIG. 5.

More specifically, the booting routine in the BIOS begins execution at block 86 in FIG. 5, where it checks the IDE HDD 54 to see if it is formatted as a secured partition requiring a password for proper access, and in particular a partition formatted specifically for this type of unit 10 (as indicated by setting of a special bit in the partition which is not used by other available software programs). If, while power was off, a used IDE HDD had been installed and had previously been used with a different operating system lacking a compatible secured partition format, the processor 41 would detect the inconsistency and proceed to block 87, where it would cause the power/diagnostic LED 18 to cyclically emit a sequence of two red flashes and one amber flash in order to indicate that it cannot boot from the internal IDE HDD 54. In this situation, the user must turn off power and then arrange to boot from either a PCMCIA boot card or through the parallel port from a personal computer.

Assuming, however, that the IDE HDD 54 in fact has the proper secured partition, control proceeds to block 88, where the BIOS loads the operating system from the IDE HDD into the RAM 43. This could be a conventional and commercially available operating system such as Novell disk operating system (DOS) Version 7.0, which supports secured HDD partitions and is commercially available from Novell, Inc. of Provo, Utah, or some other equivalent operating system. The BIOS routines then transfer processor control to the operating system, which corresponds to the transition from block 88 to block 89 in FIG. 5.

The processor 41 is designed to default to a memory address mapping scheme in which the RAM 43 does not respond to addresses between 640 KB and 1 MB. This leaves room for memory use by certain devices in conventional personal computers in which the preferred processor 41 might be utilized, most commonly for a video memory associated with a video display. However, since as discussed above the unit 10 does not include any provision for a video display, the processor begins in block 89 by adjusting the memory mapping so that the RAM 43 will respond to addresses between 640 KB and 1 MB, except for two 64 KB segments respectively starting at addresses DOOO:OOOO and FOOO:OOOO.

Then, the operating system loads a watchdog driver program, which is responsible for interacting with the watchdog circuit 47 and timer 48 in a manner discussed later. Then, if a SCSI device has been installed in either of the bays 16 and 17, the operating system loads a SCSI driver program, which interacts with the SCSI controller circuit 52 to control the SCSI device(s). Then, as to each such SCSI device which is a HDD, the operating system checks to see if it is properly partitioned and formatted and, if not, automatically partitions and formats the SCSI HDD. Then, the operating system loads a SCSI HDD driver and a SCSI CD-ROM driver. If there is no SCSI HDD or SCSI CD-ROM in the system, these drivers will remain loaded but will be inactive. Then, the operating system checks to see if a PCMCIA card of any kind is present in the slot 31, and if so, runs an enabler routine which initializes the PCMCIA controller circuit 59 so as to effect the interrupt mapping and input/output address mapping necessary for the PCMCIA card to respond properly to an associated driver program (loaded later).

Processor control then proceeds to block 91, where the processor checks to see if the IDE HDD 54 has a file containing a newer version of the BIOS routines than are present in the ROM 44. If there is a file with a newer BIOS version, then at block 92 the newer BIOS routines are copied from the IDE HDD 54 to the RAM 43, and then control returns at "A" to block 73 of FIG. 4, where the system carries out all activities discussed above, while using the newer version of the BIOS routines. When control again reaches block 91 in FIG. 5, the system will find that the BIOS routines in the RAM 43 are the updated routines from the IDE HDD 54, and will thus will proceed to block 93.

At block 93, the processor again attempts to read data from the parallel port and, if data is received, checks to see if it is a cyclic sequence of 16 bits containing the numbers 0 to 15 in sequence. If so, then the parallel port is connected through a conventional parallel cable to a conventional personal computer running a simple program which causes the personal computer to emulate a dumb terminal. In this case, control proceeds to block 94, where the operating system loads a terminate and stay resident (TSR) terminal server program, which outputs a welcome message through the parallel port and then waits for a user response.

On the other hand, if no response is received from the parallel port, or if a received response is not the required numerical sequence, block 94 is skipped by transferring control directly from block 93 to block 96.

In order to maximize storage capacity of the unit 10, each HDD in the system is operating in a conventional disk doubler mode, where a single disk doubler file is created on each drive. A conventional doubler driver program stores files in the doubler file in a manner compressing the average file to approximately 50% of its normal length, and can later retrieve and reconstitute files from the doubler file The doubler driver makes the doubler file appear like a conventional disk drive, which can have a directory tree with multiple files in each directory of the tree. Thus in block 96, the processor checks each SCSI HDD to determine if it has a disk doubler file, and if none is found it creates a disk doubler file. Then, the operating system installs the doubler software required to run the doubling function for each SCSI HDD which is present.

Then, if a PCMCIA token ring card is present, the processor loads a token ring network driver program, which will attempt to install itself. If installation fails, the PCMCIA controller circuit 59 is adjusted to change the speed setting from 4 MB to 16 MB and then a further attempt is made to load the driver program. Then, if a PCMCIA modem card is present in slot 31, the processor loads a modem communication link driver. If power is being received through the 10-Base-T port, which indicates that a network cable is connected to the port, the processor sets the network controller circuit 62 to select the 10-Base-T connector, whereas if the 10-Base-T port is not receiving power, the processor sets the network controller 62 to select the FriendlyNet connector 37. Then, if there is no PCMCIA Token Ring card, the processor loads an Ethernet network driver program which is conventional and which cooperates with the network controller circuit 62.

Then, at block 97, the processor checks to see if the terminal service TSR was loaded at block 94. If not, the processor loads a parallel port communication link driver.

Then, at block 98, the processor checks to see if this is the first time power has been turned on since factory shipment of the unit 10. If so, at block 98 the processor internally sets a unique workgroup name to ensure that the unit 10 has a unique workgroup name when it is first connected to a network or other communication link.

Control proceeds from each of blocks 98 and 99 to block 101, where the processor loads a Mux program which is discussed later and which permits a conventional network control program designed for use with a single network to simultaneously control two or more communication links, one of which may be a network. Then, a network server program is loaded, and also a CD-ROM TSR which supplements the CD-ROM driver loaded in block 89.

Then, the processor runs a disk checking routine on each of the IDE and SCSI HDDs, and stores the resulting information for each disk in a file in the root directory of that disk. If the operating system is Novell DOS, this would be the conventional command CHKDSK, which is difficult to invoke from a remote location through a communication link, but when the results from it are stored in root directory files they can be easily accessed by a remote system through a communication link.

Thereafter, the processor loads an extended services server program, which implements a remote ASPI (RASPI) function described in more detail later, and which also is responsive to certain commands or information received through a communication link for effecting local execution of specified operating system commands. Loading of the extended services server program causes it to call the watchdog driver program loaded in block 89, in order to let the watchdog driver program know that the extended services server program is present in the unit. The watchdog driver program then maintains a software timer corresponding to the server program and restarts the timer each time it is subsequently called by the server program. If the server program should ever lock up or otherwise fail to call the watchdog program to restart the associated timer before it expires, the watchdog driver program will respond to expiration of the software timer by immediately producing a software-generated processor reset.

After loading of the extended services server program is completed, the power/diagnostic LED 18 is set to emit a green color, to indicate that initialization has been completed. Finally, the network server program is started in order to commence normal system operation.

With respect to the routines discussed above in association with FIGS. 4–5, it should be noted that the unit 10 has automatically determined its own configuration, including the specific types of devices and communication link connections which are present, and in a manner so that it automatically takes into account any devices or connections which have been removed or added (for example while power was off). In association with this automatic configuration, the unit automatically loads the necessary driver programs or other software required to properly operate in the specific configuration which happens to be present. Moreover, if certain devices such as HDDs are not suitably formatted, the system automatically initializes them. It is important to note that all of this takes place automatically and without any human intervention or interaction.

Figure 6:
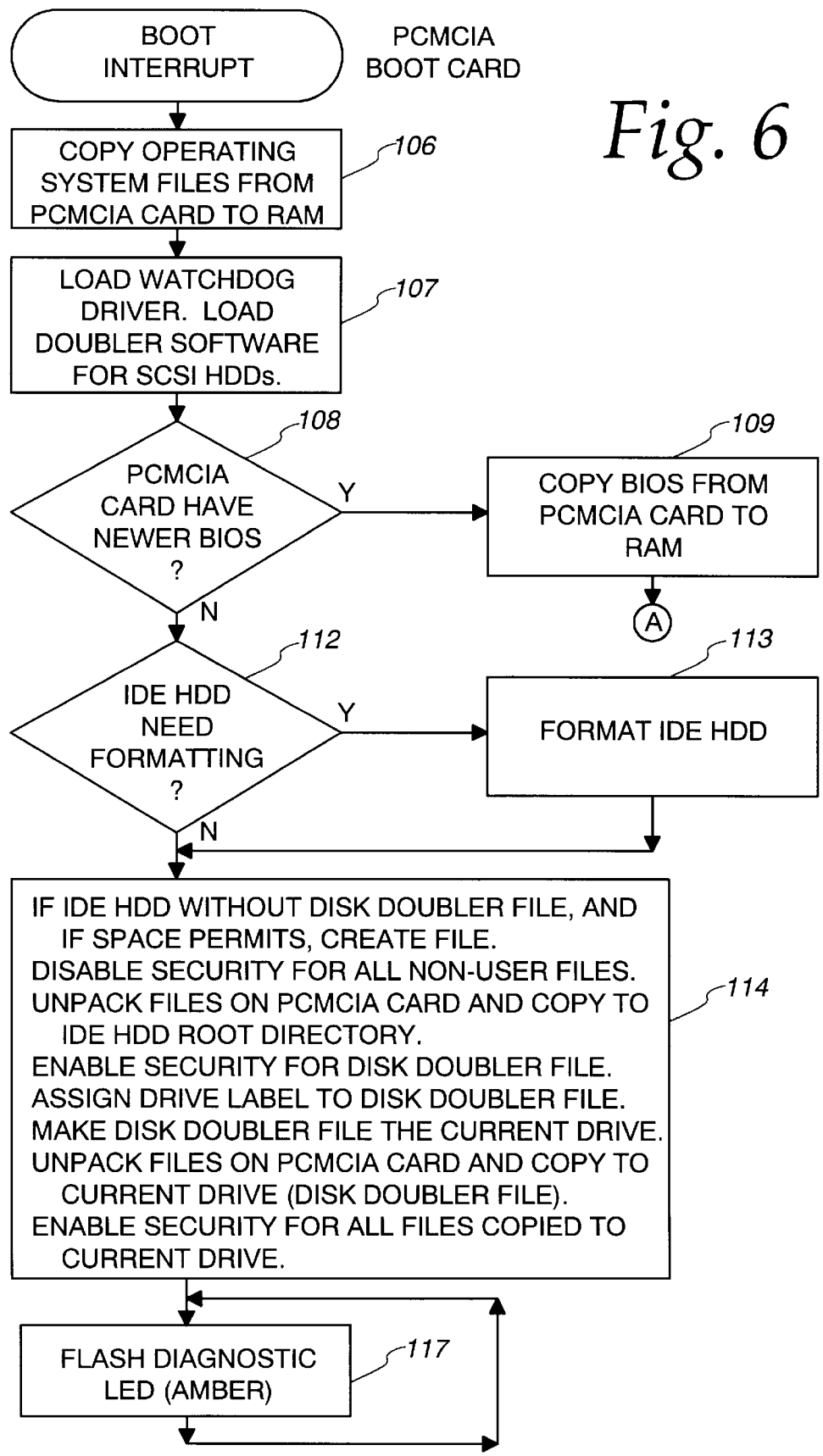
FIG. 6 is a flowchart of a routine executed by the expansion unit of FIG. 1 for booting from an external device.

If it was determined at block 74 (FIG. 4) that a PCMCIA boot card was installed in the PCMCIA slot 31, then generation of the boot interrupt at block 83 would not result in a transfer of control to block 86 in FIG. 5, but rather to block 106 in FIG. 6. At block 106, the processor 41 begins executing a boot routine from the PCMCIA boot card, which copies operating system files from the PCMCIA boot card to the RAM 43 and then transfers control to this operating system.

At 107, the operating system loads a watchdog driver program which will periodically reset the timer 48 in the watchdog circuit 47 in order to avoid generation of a reset to the processor 41. Also, a disk doubler program is loaded, which handles disk doubling on all HDDs.

Then, at block 108, the processor checks to see whether the PCMCIA boot card has a newer version of the BIOS routines than the BIOS RAM 44, much as a similar check was made at block 91 in FIG. 5. If the PCMCIA boot card has a newer BIOS, than at block 109 the newer BIOS is copied from the PCMCIA card to the RAM 43, and then control is transferred at "A" to block 73 (FIG. 4), where initialization is repeated. Control will again return in due course to block 108, where it will be determined that the BIOS in RAM 43 is now the same as the BIOS in the boot card, and control will proceed to block 112.

At block 112, the processor checks to see if the internal IDE HDD 54 needs formatting. Formatting would, for example, be required if the IDE HDD had just been installed while power was off and did not have the necessary secured partition (as discussed above with reference to block 86 in FIG. 5). If the IDE HDD needs formatting, then at block 113 the necessary partitioning and formatting is carried out. Other problems with the IDE HDD such as lost clusters may also be automatically repaired using conventional techniques.

Control proceeds from each of blocks 112 and 113 to block 114. If the internal IDE HDD does not have a disk doubler file, for example because it was just formatted at block 113, then the doubler file is created if space permits. The security provisions of the secured partition are then disabled for at least all non-user files. Then, the processor unpacks files from the PCMCIA boot card and copies certain files to the root directory of the IDE HDD, including the operating system kernel and the program which handles the disk doubler file. Then, security is enabled for the disk doubler file, a drive label is assigned to the disk doubler file, and the disk doubler file has made the current drive. Then, additional files from the PCMCIA card are unpacked and copied to the current drive, or in other words the disk doubler file. Finally, the security provisions of the secured partition are enabled for all files copied from the PCMCIA card to the disk doubler file.

Then, at block 117, the processor causes the power/diagnostic LED 18 to flash with an amber color, which is an indication that an operator should turn off power to the unit 10, remove the PCMCIA boot card, and then turn power back on. The system will then boot from the IDE HDD drive according to the routine of FIG. 5. It should be noted that the PCMCIA boot card is used only to initialize and/or load the internal IDE HDD 54 with up-to-date files, after which the system must be booted from the IDE HDD as shown in FIG. 5 in order to enter a normal operational mode. It should also be noted that the initialization and/or loading of files to the IDE HDD is carried out in FIG. 6 without any user interaction during the illustrated program sequence, which means that the IDE HDD is reliably initialized and/or loaded with little or no likelihood of error and in a minimal amount of time, and without any need for a user to learn or understand some relatively complex procedures and operating system commands necessary to initialize and/or load a hard disk.

If it was determined at block 78 in FIG. 4 that "AZDS" was received from the parallel port, so that the 64 KB block was loaded into RAM 43 at block 81, generation of the boot interrupt at 83 would cause processor control to be transferred to a routine in the 64 KB block rather than to block 86 in FIG. 5 or block 106 in FIG. 6. The sequence of events implemented by this routine in the 64 KB block is effectively identical to that shown in FIG. 6 for the PCMCIA boot card, and is therefore not illustrated and described in detail, in order to avoid redundancy.

With reference to block 101 of FIG. 5, it was explained that the processor loads a Mux program during initialization. The function and operation of the Mux program will now be described in more detail with reference to FIGS. 7 and 8. As already explained, it is possible for the unit 10 of FIG. 3 to be simultaneously connected to two or three communication links, in particular through the parallel connector 32, through a PCMCIA modem card or token ring card in the slot 31, and/or through one of the Ethernet connectors 36 and 37. On the other hand, conventional network driver programs often expect to send and receive packets from only a single network. The Mux program is designed to interface such a conventional network driver program to two or more communication links, one of which may be a network, so that the conventional network driver program believes that it is communicating with only one network when in fact it is communicating two or more communication links.

As one specific example, assume that a PCMCIA modem card is present in the slot 31 to couple the unit 10 to a first communication link, the parallel connector 32 is in use to connect the unit 10 to a second communication link, and the Ethernet connector 36 is in use to connect the unit 10 to a third communication link which is a network. Also assume that a network driver program is being used which is designed to communicate only with the Ethernet network through the connector 36, and in particular with multiple devices on the Ethernet network which each have respective network addresses.

Figure 7:
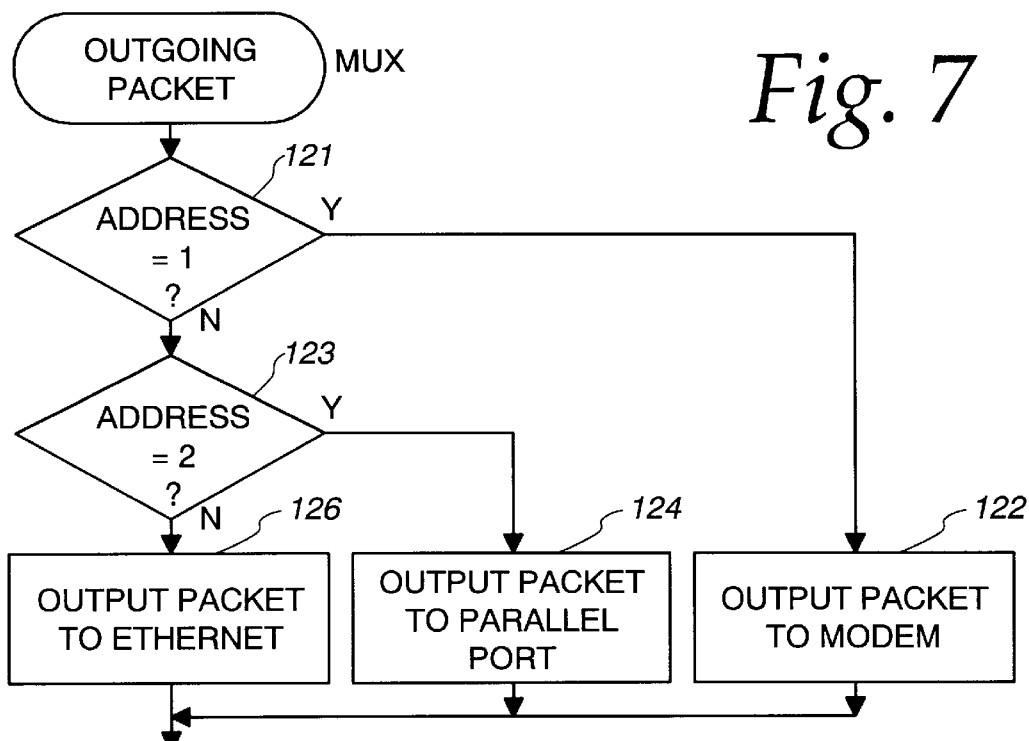
FIGS. 7 and 8 are flowcharts of respective portions of a program executed by the expansion unit of FIG. 1 to interface a conventional network driver program to multiple communication links.

Referring to FIG. 7, when the conventional network driver program outputs a packet for the Ethernet network, it thinks it is outputting the packet directly to the Ethernet driver program, but the packet is in fact intercepted by the Mux program, which then checks the network address in the packet. If it is determined at block 121 that the address is 1, then at 122 the Mux program diverts the packet to the PCMCIA modem in slot 31. Alternatively, if it is determined at block 123 that the network address is 2, the packet is diverted at block 124 to the communication link connected to the parallel connector 32. Otherwise, at block 126, the packet is forwarded through connector 36 to its intended destination on the Ethernet network. It will be recognized that, if necessary, the blocks 122 and 124 could reformat the packet where necessary to conform it to the particular packet format utilized by the communication link to which it is being diverted.

Figure 8:
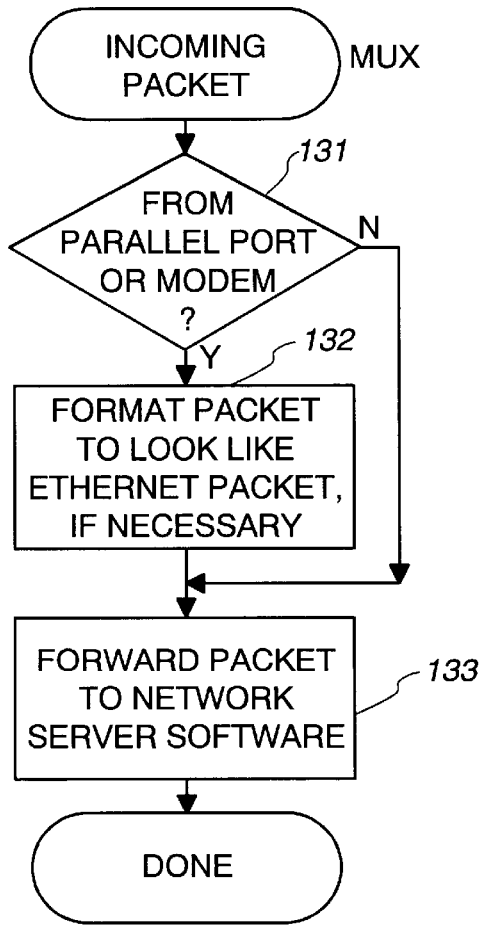

Referring to FIG. 8, when a packet is received from any one of the three communication links, it is intercepted by the Mux program which, at block 131, checks to see if the packet is from a communication link connected to the parallel connector 32 or a communication link coupled to a modem in the PCMCIA slot 31. If so, and if necessary, the incoming packet is reformatted at block 132 so as to bring it into conformity with the standard Ethernet packet. Ultimately, at block 133, the Mux program passes the incoming packet on to the conventional network driver program, which thinks that it is receiving all incoming packets directly from the Ethernet Network and driver program.

It will thus be recognized that the Mux program causes devices on two or more communication links to appear to a conventional network driver program as if they were all devices on a single network, by directing outgoing packets from the driver to the correct communication link and device, and by directing incoming packets from all communication links back to the driver program.

Figure 9:
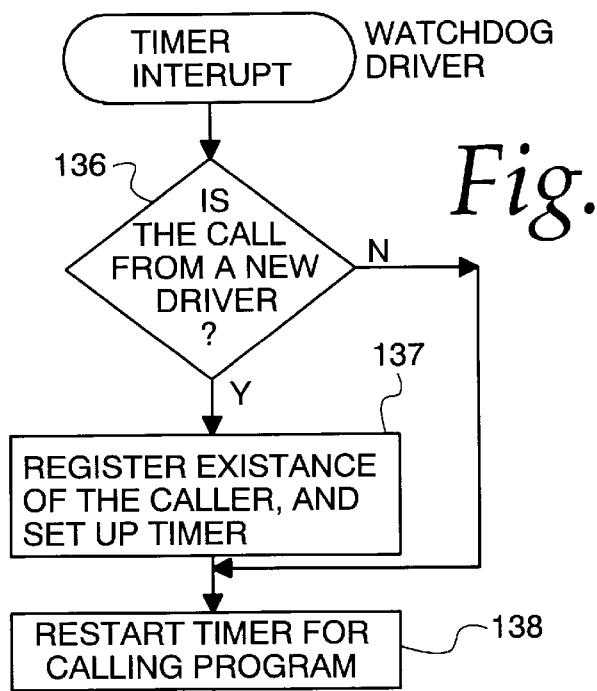
FIGS. 9 and 10 are flowcharts of respective portions of a watchdog driver program executed by the expansion unit of FIG. 1.
Figure 9:
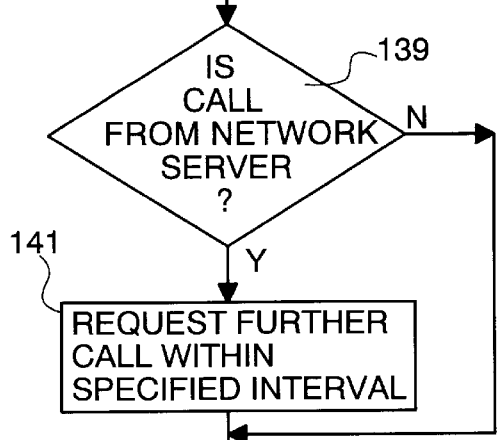
Figure 10:
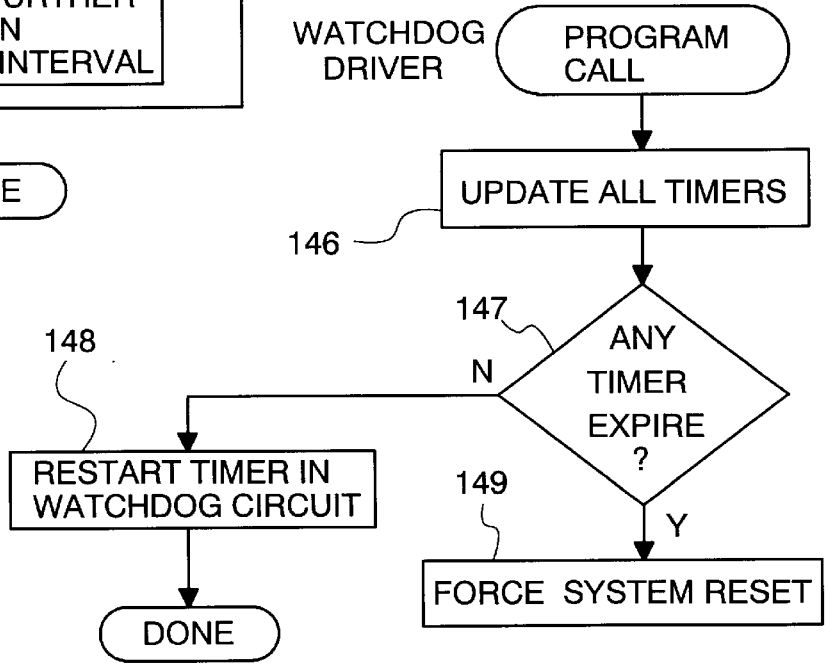

FIGS. 9 and 10 show respective portions of the watchdog driver program loaded at block 89 of FIG. 5.

As mentioned above, when the extended services server program is loaded at block 101, it executes a call to the previously-loaded watchdog driver program to let the watchdog driver program know that it is present. Thereafter, the extended services server program is responsible for executing a call to the watchdog driver program at least every 10 seconds in order to let the watchdog driver program know that it is operating rather than locked up. If the extended services server program fails to execute a call to the watchdog driver program within the specified interval, a software timer maintained by the watchdog driver program will expire and the watchdog driver program will cause the watchdog circuit 47 (FIG. 3) to immediately generate a processor reset at 49 under the assumption that there has been some sort of program failure. In the preferred embodiment, the extended services server program is the only program which registers with and is monitored by the watchdog driver program, but the watchdog driver program has the capability to monitor several programs in addition to the extended services server program.

Referring in more detail to FIG. 9, when a program such as the extended services server program executes a call to the watchdog driver program, the watchdog driver program first determines at block 136 whether this is the first time it has been called by that particular program. If so, then at 137 it registers the existence of the calling program, and then sets up a software timer for it. On subsequent calls from the same program, block 137 is skipped. At block 138, the watchdog driver program restarts the software timer for the particular calling program.

The watchdog driver program also monitors the network driver program running in the processor, but since the network driver program can be a conventional and commercially available driver which is not designed to seek out and register with the watchdog driver program of the unit 10, the watchdog driver program assumes responsibility for monitoring the network driver program by issuing to the network driver program a request that it wait a predetermined interval and then issue a call back to the watchdog timer program, which is a capability inherent to conventional network driver programs. Therefore, after updating the timer associated with the calling program at block 138, the watchdog driver program checks at block 139 to see if the call is from the network driver program. If it is, then at block 141 the watchdog driver program issues to the network driver program a further request that it wait a specified interval and then issue a further call back to the watchdog driver program.

Turning to FIG. 10, which shows a different portion of the watchdog driver program, it will be recognized by those of ordinary skill in the art that, in a conventional manner, the processor 41 includes a time-based interrupt which occurs about 18.2 times per second. This interrupt generates a call to the portion of the watchdog driver program shown in FIG. 10, and at block 146 the watchdog driver program updates the software timer for each program it is monitoring in order to reflect the time which has elapsed since the last time-based interrupt. Then, at block 147, the watchdog driver program checks to see if any timer has expired. If not, then at block 148 the watchdog driver program restarts the hardware timer 48 in the watchdog circuit 47, and then returns to the interrupted program. Otherwise, at block 149, the watchdog driver program causes the watchdog circuit 47 of FIG. 3 to immediately generate a processor reset at 49, which in turn forces processor control to block 71 in FIG. 4.

FIG. 11 shows a conventional personal computer 156, which includes a SCSI tape drive 158, and a SCSI controller circuit 159 identical to the SCSI controller circuit 52 of FIG. 3. The personal computer 156 is executing software 162 which includes a conventional backup program 163, and a conventional ASPI driver program 164. The backup program 163 is used to take data from a not-illustrated conventional hard disk drive and store it on a tape in the SCSI tape drive 158 for backup purposes.

The ASPI driver program 164 is conventional, and implements a conventional standard known as ASPI and developed by Adaptec of Milpitas, Calif. On one side, the ASPI driver program 164 provides a very standard interface for any program which wishes to issue commands to a SCSI device such as the tape drive 158, and on the opposite side the ASPI driver communicates with the SCSI controller circuit 159 in a manner which takes into account specific idiosyncrasies of the particular controller circuit 159. Thus, if the controller circuit 159 were replaced with a different conventional SCSI controller circuit, the ASPI driver program 164 would be replaced with a corresponding conventional ASPI driver program which was familiar with the idiosyncrasies of the new SCSI controller circuit but which still provided the same standard ASPI interface to the backup program 163 or other application program. Thus, the backup program 163 can communicate with SCSI devices without knowing specific idiosyncrasies of a number of different conventional SCSI controller circuits.

Examples of ASPI commands which can be issued by the backup program 163 include a command to request that the SCSI controller circuit 159 provide information about the SCSI configuration such as how many SCSI devices are present, a command which instructs the SCSI controller circuit 159 to reset a particular SCSI device, and a command which instructs the SCSI controller circuit 159 to execute a SCSI command with respect to any SCSI device. When the backup program 163 wants to pass an ASPI command to the ASPI driver program 164, it normally passes an address or pointer to a command block in memory. If the ASPI command is the one which indicates that a particular SCSI command should be executed, then the command block will include an identification of the particular SCSI command and any necessary parameters. If the ASPI command or SCSI command involves a transfer of data, the command block may include a pointer to a separate data block in the memory which contains the data to be transferred.

In a typical conventional sequence intended to transfer data from a hard disk to the tape device 158 for backup purposes, the backup program 163 would first communicate with the operating system to determine if the ASPI driver program 164 is loaded, and upon an affirmative reply would issue ASPI commands to the driver program 164 to inquire about the SCSI configuration and the particular SCSI device types present. Then, after identifying the SCSI tape drive 158, the backup program 163 would issue a series of ASPI commands through the driver program 164 which instruct the controller 159 to perform SCSI commands, such as SCSI commands to rewind the tape in the tape drive 158, to format the header of the tape, to write data from a specified data block onto the tape, to write a mark on the tape indicating the end of the data, and then to rewind the tape again.

Everything described above in association with FIG. 11 is entirely conventional. Referring now to the unit 10 (FIG. 3) according to the present invention, the unit has a permanent hard disk drive in the form of IDE HDD 54, and may have at least one additional SCSI hard disk drive in one of the bays 16 or 17. The other bay can include a SCSI tape device equivalent to that shown at 158 in FIG. 11. Because the unit 10 is intended to function as a network server, as to which its primary function is to store data on its hard disks, it is important that the data be backed up periodically in order to avoid its loss in the event of a component failure.

However, as emphasized above, the expansion unit 10 is specifically designed to have no character or graphic display, in order to both save expense and so that it is effectively automated for purposes of both configuration and operation in order to optimize efficiency and reliability. This presented a problem regarding the operation of backing up data to a tape drive, which is normally a user-initiated operation, and in fact the conventional backup program 163 shown in FIG. 11 is highly user interactive. A user typically communicates with the unit 10 from a personal computer coupled to the unit 10 through a communication link, and could run the backup program 163 in the personal computer, but the typical conventional backup 163 does not have any capability to control a backup in a remote device through a communication link. While it would be possible to develop a new backup program which would run in the user's personal computer and have the capability to effect remote backups through a communication link, this would require that the user become familiar with the special backup program as well as any conventional backup program already present in the user's computer for purposes of backing up disk drives local to that computer, spend additional money to purchase the extra backup program, and allocate additional disk space to maintain two separate backup programs used for different purposes. It was considered desirable that the user be able to use a single conventional off-the-shelf backup program with which he or she might already be familiar in order to effect backup of storage devices located both locally in the user's computer and across the communication link in the unit 10, all of these devices preferably appearing to the user to be local devices. Accordingly, the approach shown in FIG. 12 was developed.

Referring to FIG. 12, a conventional personal computer 170 is coupled through a communication link such as a network cable 171 to the dedicated expansion unit 10 according to the present invention. The hardware 172 in the expansion unit 10 includes the network controller circuit 62 and SCSI controller circuit 52 of FIG. 3, as well as a conventional SCSI tape drive 158 removably mounted in one of the drive bays 16 and 17. The software 176 in the expansion unit 10 includes a conventional network driver program 177, the conventional ASPI driver program 164 (which was also depicted in FIG. 11), and a remote ASPI (RASPI) server program 178 which is a part of the present invention.

The hardware 181 of the personal computer 170 includes a conventional network controller circuit 182. The software 186 includes the conventional backup program 163 (which was also depicted in FIG. 11), a conventional network driver program 177, and a RASPI driver 188 which is a part of the present invention.

As an overview, the backup program 163 and ASPI driver program 164 operate in substantially the same manner as they did in FIG. 11, except that they are now in different devices on the network. In particular, the backup program 163 outputs ASPI commands under the assumption that the ASPI driver program 164 is still present in the personal computer 170. However, these ASPI commands are in fact intercepted by the RASPI driver program 188, which routes them through the network at 187, 182, 171, 62 and 177, where they are picked up by the RASPI server program 178, which then passes the ASPI commands to the ASPI driver program 164. The ASPI driver program 164 thinks it is receiving the commands directly from the backup program 163, and controls the SCSI controller circuit 52 and SCSI tape drive 158 in the same manner as the circuit 159 and tape drive 158 were controlled in the conventional arrangement of FIG. 11.

In the event an ASPI command requires that information be returned from the ASPI driver program 164 back to the backup program 163, the ASPI driver program 164 produces output in a conventional manner with the assumption that the backup program 163 is resident in the unit 10, and according to the invention the RASPI server program 178 intercepts the output and routes it through the network at 177, 62, 171, 182 and 187, where it is picked up by the RASPI driver program 188 and then supplied to the backup program 163, the backup program 163 believing that it is receiving the information directly from the ASPI driver program 164.

Figure 13:
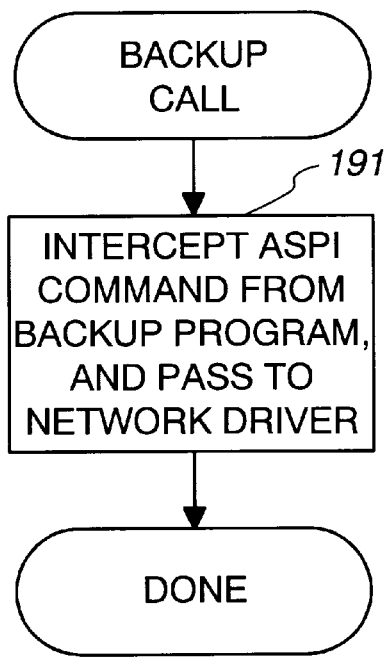
FIGS. 13 and 14 are views of respective portions of a program executed by the personal computer of FIG. 12.
Figure 14:
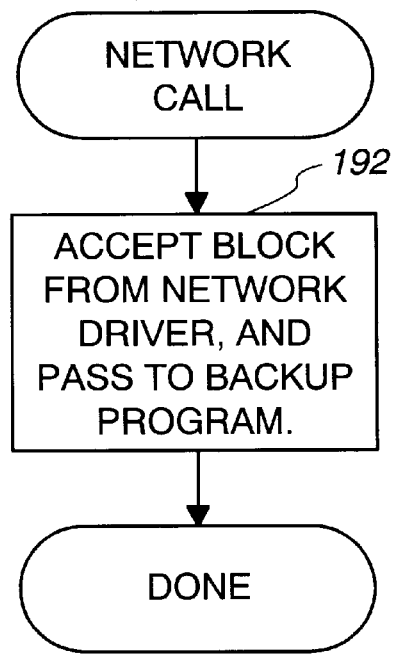

FIGS. 13 and 14 are flowcharts depicting at a broad level the function of the RASPI driver program 188 of FIG. 12. In particular, when the backup program 163 outputs an ASPI command, the RASPI driver program 188 intercepts it at block 191 and passes it to the network driver program 187. On the other hand, when the network driver program 187 receives information through the network from the RASPI server 178, the RASPI driver program 188 accepts it at block 192 and passes it to the backup program 163.

Figure 15:
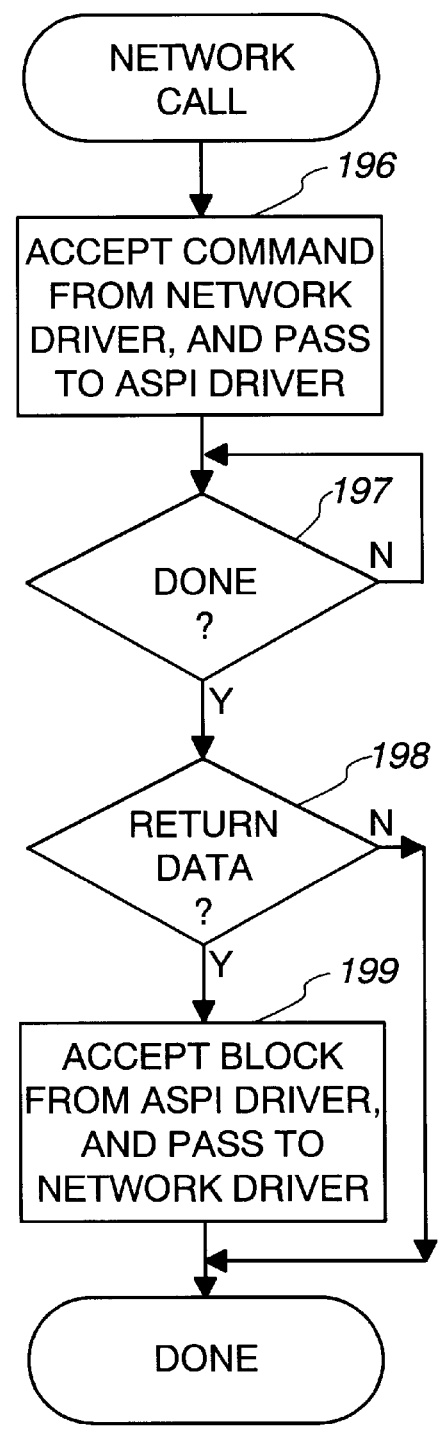
FIG. 15 is a flowchart of a routine executed by the expansion unit of FIGS. 1 and 12.

FIG. 15 is a flowchart showing at a broad level the function of the RASPI server program 178 according to the present invention. When the RASPI server program 178 receives an ASPI command through the network, it accepts the command at 196 and passes it to the ASPI driver program 164 as an ASPI command, and then waits at 197 for completion of the command. Then, at 198, it checks to see if information is to be returned and, if so, accepts the information from the ASPI driver program 164 at block 199 and sends it back through the network.

It will be recognized by those skilled in the art that, as a practical matter, the routine of FIG. 15 is implemented as an interrupt driven routine, where the processor does not actually sit idle at block 197 while waiting for a command to be completed, but instead exits the RASPI server program 178 and periodically re-enters it under interrupt control to check to see if the ASPI command has been completed, and then proceeds to block 198.

It is also important to understand how the RASPI driver program 188 and RASPI server program 178 establish communication through the network 171. The network driver program 177 has a network address or "socket" which is predetermined and known as "public". The RASPI server program 188 is written to know what this public socket is and to search the network for it. After locating the public socket of the network driver program 177, the RASPI driver program 188 can determine the local or "private" socket of the associated RASPI server program 178, and then the RASPI driver program 188 supplies the RASPI driver program 178 with its own local or private socket, after which the RASPI driver program 188 and the RASPI server program 178 communicate through the network 171 and network drivers 182 and 62 by sending packets back and forth to their respective private sockets.

Although a particular preferred embodiment of the invention has been disclosed in detail for illustrative purposes, it will be recognized that variations or modifications of the disclosed system which lie within the scope of the present invention.

We claim:

1. An apparatus, comprising: a processor; a first hardware communication link; a first driver program executed by said processor to control communications with said first hardware communication link; a second hardware communication link; a second driver program executed by said processor to control communications with said second hardware communication link; network application program means executed by said processor and capable of outputting information for and receiving information from only a single driver program, said network application program means outputting outgoing information in a predetermined format and accepting incoming information in said predetermined format, said outgoing information including address information; and further program means executed by said processor for intercepting said outgoing information from said network application program means and for supplying said outgoing information respectively to said first and second driver programs for said first and second hardware communication links when said address information therein respectively has a first value and a second value different from said first value, and for intercepting incoming information from each of said first and second driver programs for said first and second hardware communication links and for supplying said incoming information from said first and second driver programs to said network application program means with respective different address values therein which respectively correspond to said first and second hardware communication links wherein at least one of said first and second hardware communication links has a format for information which is different from said predetermined format, and wherein said further program means includes means for reformatting information passing through said further program means between said network application means and said one of said first and second hardware communication links.

2. An apparatus according to claim 1, wherein said further program means appears to said application program means to be a network driver program.

3. An apparatus according to claim 1, wherein said first hardware communication link is a predetermined network, and said second hardware communication link is a device which is physically independent of said predetermined network but which appears to said network application program means to be a device on said predetermined network.

4. An apparatus according to claim 3, wherein said address information in said outgoing information from said network application program means and said address values in said incoming information to said network application program means appear to said network application program means as addresses of said predetermined network.

5. An apparatus according to claim 3, wherein said predetermined network is an Ethernet network.

6. An apparatus according to claim 3, wherein said predetermined network is a token ring network.

7. An apparatus according to claim 6, wherein said token ring network includes a PCMCIA token ring network card.

8. An apparatus according to claim 3, wherein said second hardware communication link is a parallel port.

9. An apparatus according to claim 1, including a DOS operating system executed by said processor, wherein said network application program means, said further program means, and said first and second driver programs run in cooperation with said DOS operating system.

* * * * *